(12) United States Patent
Campbell et al.

(10) Patent No.: US 8,957,908 B2
(45) Date of Patent: Feb. 17, 2015

(54) RAPID REPRESENTATIONAL THUMBNAIL IMAGES FOR BUSINESS INTELLIGENCE DASHBOARDS

(75) Inventors: Kyle M. Campbell, Ottawa (CA); Robert Y. Nonez, Orleans (CA); Biraj Saha, Ottawa (CA); Xiaowei S. Zhong, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 13/549,885

(22) Filed: Jul. 16, 2012

(65) Prior Publication Data
US 2014/0015846 A1 Jan. 16, 2014

(51) Int. Cl.
*G06T 3/40* (2006.01)
*G06T 11/00* (2006.01)

(52) U.S. Cl.
USPC ......................................................... 345/589

(58) Field of Classification Search
CPC ....... G06T 3/40; G06T 11/00; G06T 2200/24; H04N 1/00456
USPC ......................................................... 345/589
See application file for complete search history.

(56) References Cited

U.S. PATENT DOCUMENTS

| 6,738,529 | B1 * | 5/2004 | Crevier et al. ................ 382/282 |
| 7,073,121 | B2 | 7/2006 | Brown et al. |
| 7,412,659 | B2 * | 8/2008 | Wessling et al. .............. 715/764 |
| 7,859,708 | B2 * | 12/2010 | Austin .......................... 358/1.18 |
| 7,925,985 | B2 | 4/2011 | Moore |
| 2004/0139390 | A1 | 7/2004 | Krolczyk et al. |
| 2008/0104535 | A1 | 5/2008 | DeLine et al. |
| 2008/0235075 | A1 * | 9/2008 | Couture et al. ................. 705/10 |
| 2009/0300511 | A1 * | 12/2009 | Behar et al. ................... 715/745 |
| 2010/0278443 | A1 | 11/2010 | Pascali et al. |
| 2011/0214081 | A1 * | 9/2011 | Dobrin et al. ................. 715/771 |
| 2012/0123989 | A1 * | 5/2012 | Yu et al. ......................... 706/47 |
| 2012/0226626 | A1 * | 9/2012 | Venkateswaran et al. .... 705/342 |

OTHER PUBLICATIONS

Matulic, Fabrice "Automatic Selection of Visually Attractive Pages for Thumbnail Display in Document List View", Digital Information Management, 2008. ICDIM 2008. Third International Conference, 6 pgs.
Sengupta et al. "Semantic Thumbnails—A Novel Method for Summarizing Document Collections", Proceedings of the 22nd annual international conference on Design of Communication, Oct. 10-13, 2004, 2004 ACM, 7 pgs.

* cited by examiner

*Primary Examiner* — David Zarka
*Assistant Examiner* — Shivang Patel
(74) *Attorney, Agent, or Firm* — Shumaker & Sieffert, P.A.

(57) ABSTRACT

In one example, a method includes identifying a plurality of data representation features comprised in each of one or more dashboards. The method further includes identifying formatting data for a format of the data representation features in each of the one or more dashboards. The method further includes generating one or more thumbnail images corresponding to each of the one or more dashboards, wherein each of the one or more thumbnail images comprises a plurality of stock images representative of a corresponding one of the data representation features in the corresponding dashboard, in a format that represents the format of the corresponding dashboard.

21 Claims, 6 Drawing Sheets

RAPID REPRESENTATIONAL THUMBNAIL IMAGES FOR BUSINESS INTELLIGENCE DASHBOARDS

TECHNICAL FIELD

The invention relates to business intelligence systems, and more particularly, to dashboard environments for business intelligence systems.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems, and other enterprise software systems.

Many enterprise performance management and business planning applications require a large base of users to enter data that the software then accumulates into higher level areas of responsibility in the organization. Moreover, once data has been entered, it must be retrieved to be utilized. The system may perform mathematical calculations on the data, combining data submitted by many users. Using the results of these calculations, the system may generate reports for review by higher management. Often these complex systems make use of multidimensional data sources that organize and manipulate the tremendous volume of data using data structures referred to as data cubes. Each data cube, for example, includes a plurality of hierarchical dimensions having levels and members for storing the multidimensional data.

Reporting and analysis end user products (typically referred to as Business Intelligence, or BI, tools) allow users to author reports and perform data exploration and analysis on a myriad of data sources, such as multi-dimensional data structures, relational databases, flat files, Extensible Markup Language ("XML") data, data streams, and unorganized text and data. BI tools may be used to prepare and aggregate individual reports and analyses by executing queries on underlying data sources, and to present those reports and analyses to a user-accessible format such as a BI dashboard environment.

SUMMARY

In general, examples disclosed herein are directed to generating report thumbnail images in a business intelligence (BI) dashboard that informatively represent heterogeneous BI documents, without having to take the time to query underlying data sources.

In one example, a method includes identifying a plurality of data representation features comprised in each of one or more dashboards. The method further includes identifying formatting data for a format of the data representation features in each of the one or more dashboards. The method further includes generating one or more thumbnail images corresponding to each of the one or more dashboards, wherein each of the one or more thumbnail images comprises a plurality of stock images representative of a corresponding one of the data representation features in the corresponding dashboard, in a format that represents the format of the corresponding dashboard.

In another embodiment, a computing system includes one or more processors; one or more computer-readable data storage devices; and a software application, stored on the one or more computer-readable data storage devices for execution by the one or more processors, and configured for generating one or more business intelligence thumbnail images for a business intelligence portal. The software application includes program instructions for identifying a plurality of data representation features comprised in each of one or more dashboards. The software application further includes program instructions for identifying formatting data for a format of the data representation features in each of the one or more dashboards. The software application further includes program instructions for generating one or more thumbnail images corresponding to each of the one or more dashboards, wherein each of the one or more thumbnail images comprises a plurality of stock images stored on the one or more computer-readable data storage devices representative of a corresponding one of the data representation features in the corresponding dashboard, in a format that represents the format of the corresponding dashboard.

In another embodiment, a computer-readable storage medium includes executable instructions stored on a non-transitory computer-readable storage medium. The executable instructions are configured for causing one or more programmable processors to identify a plurality of data representation features comprised in each of one or more dashboards; identify formatting data for a format of the data representation features in each of the one or more dashboards; and generate one or more thumbnail images corresponding to each of the one or more dashboards, wherein each of the one or more thumbnail images comprises a plurality of stock images representative of a corresponding one of the data representation features in the corresponding dashboard, in a format that represents the format of the corresponding dashboard.

The details of one or more embodiments of the invention are set forth in the accompanying drawings and the description below. Other features, objects, and advantages of the invention will be apparent from the description and drawings, and from the claims.

DETAILED DESCRIPTION

Various examples are disclosed herein of generating thumbnail images to represent business intelligence (BI) dashboards in a business intelligence (BI) portal, to quickly and informatively represent heterogeneous BI dashboards without having to take the time to query underlying data sources. A system of this disclosure may generate a thumbnail that represents the content of each of one or more BI dashboards in a way that usefully informs the user of the content of the BI dashboards, in a way that is able to render much more quickly than is possible with the processing and communication burden of querying multiple underlying data sources that are accessed by the BI dashboards.

Figure 1:
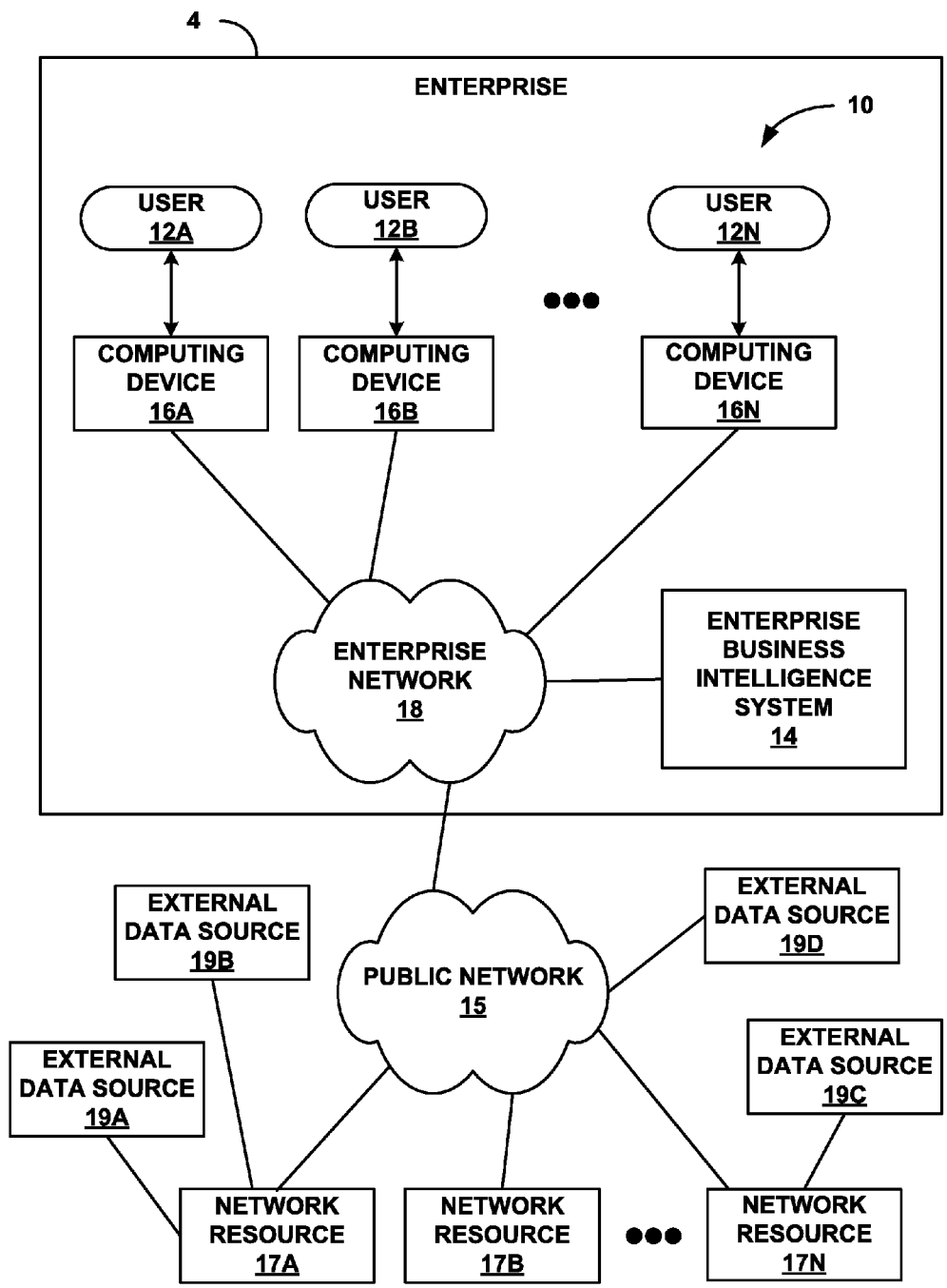
FIG. 1 is a block diagram illustrating an example enterprise having a computing environment in which a plurality of users interacts with an enterprise business intelligence system and data sources accessible over a public network.

FIG. 1 illustrates an example context in which techniques disclosed herein may be used. FIG. 1 is a block diagram illustrating an example enterprise 4 having a computing environment 10 in which a plurality of users 12A-12N (collectively, "users 12") may interact with an enterprise business intelligence (BI) system 14. In the system shown in FIG. 1, enterprise business intelligence system 14 is communicatively coupled to a number of client computing devices 16A-16N (collectively, "client computing devices 16" or "computing devices 16") by an enterprise network 18. Users 12 interact with their respective computing devices to access enterprise business intelligence system 14. Users 12, computing devices 16A-16N, enterprise network 18, and enterprise business intelligence system 14 may all be either in a single facility or widely dispersed in two or more separate locations anywhere in the world, in different examples.

For exemplary purposes, various examples of the techniques of this disclosure may be readily applied to various software systems, including enterprise business intelligence systems or other large-scale enterprise software systems. Examples of enterprise software systems include enterprise financial or budget planning systems, order management systems, inventory management systems, sales force management systems, business intelligence tools, enterprise reporting tools, project and resource management systems, and other enterprise software systems.

In this example, enterprise BI system 14 includes servers that run BI dashboard web applications and may provide business analytics software. A user 12 may use a BI portal on a client computing device 16 to access any of potentially multiple BI dashboards to view and manipulate data via their respective computing devices 16. This may include data from any of a wide variety of sources, including from multidimensional data structures and relational databases within enterprise 4, as well as data from a variety of external sources that may be accessible over public network 15. A single BI portal being rendered on one of client computing devices 16 may include thumbnail images for each of multiple BI dashboards, where each of the thumbnail images represents an available BI dashboard.

Users 12 may use a variety of different types of computing devices 16 to interact with enterprise business intelligence system 14 and access a BI portal and BI dashboards, a.k.a. BI mashups or mashup environments, via enterprise network 18. For example, an enterprise user 12 may interact with enterprise business intelligence system 14 and run a business intelligence portal using a laptop computer, a desktop computer, or the like, which may run a web browser. Alternatively, an enterprise user may use a smartphone, tablet computer, or similar device, running a business intelligence portal in either a web browser or a dedicated mobile application for interacting with enterprise business intelligence system 14. In either case, a BI portal running on a user's computing device 16 may access various BI dashboards and data sources from within enterprise business intelligence system 14, as well as any of a variety of external network resources 17A-17N (collectively, "network resources 17") and any of a variety of external data sources 19A-19N (collectively, "external data sources 19") through public network 15.

Enterprise network 18 and public network 15 may represent any communication network, such as a packet-based digital network such as a private enterprise intranet or a public network like the Internet. In this manner, computing environment 10 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

It may be helpful for a BI dashboard thumbnail image to represent its associated BI dashboard representationally, in a way that conveys useful information about the associated BI dashboard to the user. However, to render an image of the dashboard itself would typically require querying all the underlying data sources for the dashboard, which may include multiple data sources of multiple types both within and outside enterprise 4. This may take significant periods of time, such as several seconds up to a minute or more, depending on the data sources and the communication infrastructure involved, and would have to be done for each of multiple BI dashboards.

Various examples detailed below provide informative and representational BI dashboard thumbnail images using stock images that represent each of the elements in each dashboard and without performing new queries of the underlying data sources. This enables rendering the BI dashboard thumbnail images in a rapid period of time, such as a fraction of a second, in a time that may be negligible or apparently instantaneous to the user. At the same time, each BI dashboard thumbnail may still represent its associated BI dashboard representationally, thereby conveying useful information that facilitates understanding of and navigation among the BI dashboards, instead of just using generic thumbnail images for the BI dashboards in the BI portal. BI system 14 may also generate representational BI dashboard thumbnail images entirely on the server side within BI system 14 and without relying on software on the client computing devices 16, and thereby comply with requirements for enterprise software to be "zero footprint" on the client side, i.e., on client computing devices 16.

A dashboard thumbnail image may be "representational" of its corresponding BI dashboard in that it may visually represent the features of that particular BI dashboard, which may include the arrangement of different features in the dashboard, the types of features, the proportions of the features relative to each other or to the dashboard as a whole, or the colors of the features or of the dashboard in general, for example. Each dashboard thumbnail may be populated with stock images that represent each of the elements of the corresponding dashboard, and formatted to resemble or represent the formatting of the corresponding dashboard. Each stock image may simply be a static image that represents the type of data representation of its corresponding feature in the dashboard, such as a chart, a graph, a BI report, a web application widget, or other feature. The visual associations between each particular dashboard thumbnail and its corresponding dashboard may be helpful in enabling a user to rapidly distinguish among and identify the dashboards represented by the dashboard thumbnails in a BI portal, and to select a particular dashboard thumbnail to open a desired dashboard.

The server may identify the types of dashboard elements and aspects of how the dashboard elements and the dashboard overall are formatted, including the proportions, aspect ratios, sizes, positions, and color schemes of the dashboard elements and the dashboard overall, and reproduce or represent this formatting in the thumbnail. Each thumbnail may therefore serve as an evocative representation of its corresponding dashboard that can be generated very rapidly, such as in a fraction of a second, yet that may enable a user rapidly to comprehend or recall the content of each of the dashboards. A user may then be rapidly enabled to select a desired dashboard to open.

Figure 2:
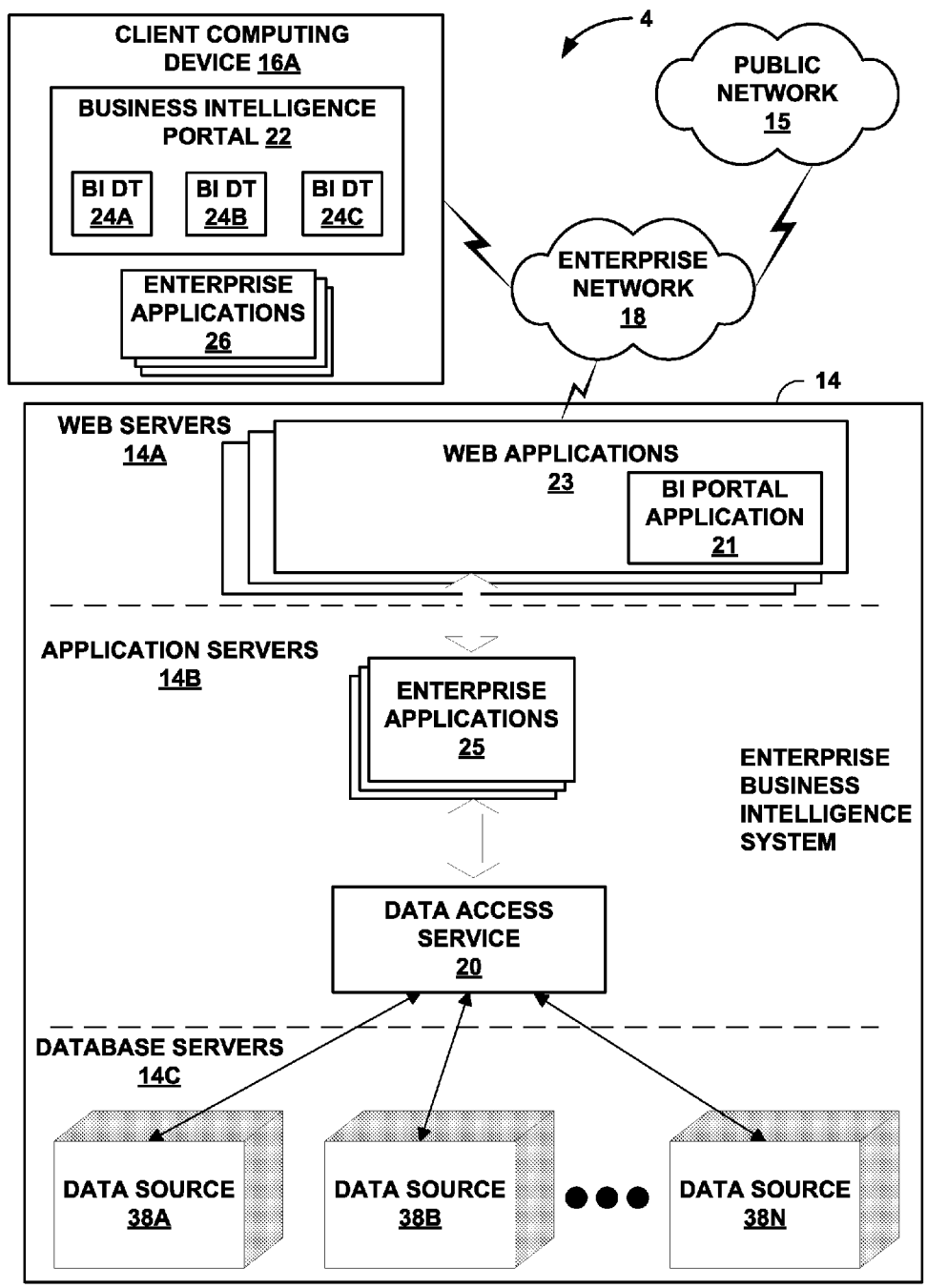
FIG. 2 is a block diagram illustrating one embodiment of an enterprise business intelligence system with a client computing device running a business intelligence portal with various selectable business intelligence dashboard thumbnail images.

FIG. 2 is a block diagram illustrating in further detail portions of one embodiment of an enterprise business intelligence (BI) system 14. In this example implementation, a single client computing device 16A is shown for purposes of example and includes a business intelligence (BI) portal 22, multiple BI dashboard thumbnails 24A, 24B, 24C ("BI dashboard thumbnails 24"), and one or more client-side enterprise software applications 26 that utilize and manipulate multidimensional data. Business intelligence (BI) dashboard assembly tool 22 may be rendered within a general web browser application, within a locally hosted application or mobile application, or other user interface. BI portal 22 and BI dashboard thumbnails 24 may be rendered using any combination of application software and data local to the computing device it's being rendered on, and remotely hosted in one or more application servers or other remote resources.

BI dashboard thumbnails 24 may each represent an individual BI dashboard from a different BI context or service. Each BI dashboard may include content elements such as BI report elements, e.g., for business intelligence reports generated with enterprise business intelligence system 14, as well as web application widgets or other utility or data elements that may be sourced from external resources through public network 15. Each BI dashboard may also include content elements such as charts or graphs that may be sourced from within or external to the enterprise.

FIG. 2 depicts additional detail for enterprise business intelligence system 14 and how it may be used to provide a BI portal 22 for accessing BI dashboards through BI dashboard thumbnails 24. A BI dashboard may contain a number of icons, widgets, lists, charts, graphs, or other user interface elements that each represents, provides data from, or links to any of a variety of types of resource, such as a BI report, a software application, a database, a spreadsheet, a data structure, a flat file, Extensible Markup Language ("XML") data, a data stream, unorganized text or data, or other type of file or resource.

As depicted in FIG. 2, enterprise business intelligence system 14 is implemented in accordance with a three-tier architecture: (1) one or more web servers 14A that provide web applications 23 with user interface functions, including a BI portal application 21; (2) one or more application servers 14B that provide an operating environment for enterprise software applications 25 and a data access service 20; and (3) database servers 14C that provide one or more data sources 14C. The data sources 14C may include two-dimensional databases and/or multidimensional databases, i.e. cubes. The data sources may be implemented using a variety of vendor platforms, and may be distributed throughout the enterprise. As one example, the data sources 14C may be multidimensional databases configured for Online Analytical Processing (OLAP). As another example, the data sources 14C may be multidimensional databases configured to receive and execute Multidimensional Expression (MDX) queries of some arbitrary level of complexity. As yet another example, the data sources 14C may be two-dimensional relational databases configured to receive and execute SQL queries, also with an arbitrary level of complexity.

Multidimensional data structures are "multidimensional" in that each multidimensional data element is defined by a plurality of different object types, where each object is associated with a different dimension. The enterprise applications 26 on computing device 16A may issue business queries to enterprise business intelligence system 14 to build reports. Enterprise business intelligence system 14 includes a data access service 20 that provides a logical interface to the data sources 14C. Client computing device 16A may transmit query requests through enterprise network 18 to data access service 20. Data access service 20 may, for example, execute on the application servers intermediate to the enterprise applications 25 and the underlying data sources in database servers 14C. Data access service 20 retrieves a query result set from the underlying data sources, in accordance with query specifications. Data access service 20 may intercept or receive queries, e.g., by way of an API presented to enterprise applications 25. Data access service 20 may then return this result set to enterprise applications 25, 26 as BI reports that are made available in BI dashboards accessible through BI portal 22 on client computing device 16A. The process of generating a BI dashboard may therefore involve a number of steps and interactions among a potentially significant number of layers and data sources, a significant amount of complexity, and a number of opportunities for server latencies or data source queries to introduce delays, which could extend from several seconds up to minutes, depending on the system.

BI portal 22 running on client computing device 16A may include a potentially large number of different BI dashboards accessible through it. When a user opens BI portal 22, the user may want to be able to select one BI dashboard to open from among several available. If BI portal 22 were to represent each available dashboard with a simple name or single stock image to represent the dashboard, this could be rendered quickly but may not be very informative or intuitive to the user. If BI portal 22 were to represent each available dashboard by actually running each dashboard and rendering each dashboard in miniature in the portal, this would be very informative once the dashboards had executed, but the complexity and opportunity for server latencies or other delays would mean the user may face a significant wait before being presented with representations of the dashboards to choose from. Instead, by identifying the types of data representations and the formatting of the dashboards and generating BI dashboard thumbnails 24 with stock images to represent each of the data representations and with formatting that matches the dashboards, BI portal application server 21 may combine the best of both worlds by generating BI dashboard thumbnails 24 that are individually customized to be highly representative of their corresponding dashboards, but without going through the process of sending queries through enterprise applications 25, data access service 20, and underlying data sources 38, as well as through public network 15 to external data sources 19, before being able to populate portal 22.

Figure 3:
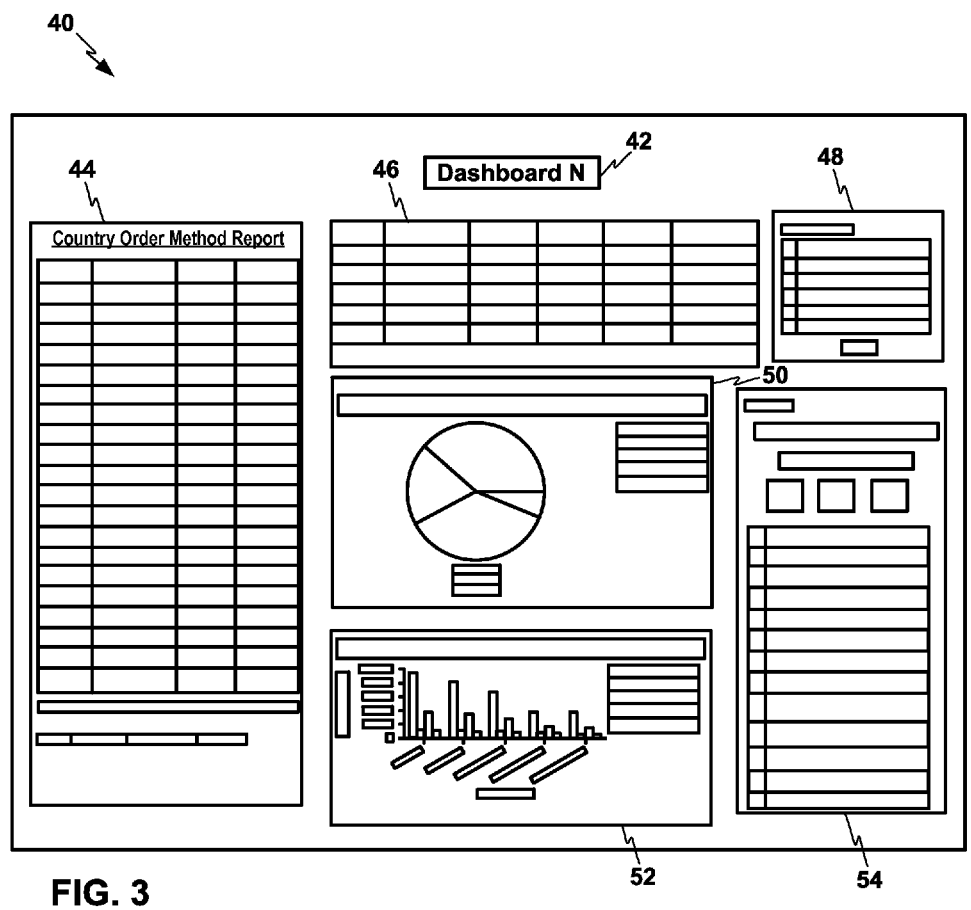
FIG. 3 illustrates an example business intelligence dashboard that may be generated by a business intelligence system.

FIG. 3 depicts a simplified view of an example business intelligence (BI) dashboard 40, that may be generated by enterprise business intelligence system 14 of FIGS. 1 and 2 and rendered on client computing device 16A after a user selects a corresponding representation of BI dashboard 40 to open. BI dashboard 40 includes a title or caption 42 and a number of data representation features 44, 46, 48, 50, 52, and 54, including a BI report 44, a spreadsheet 46, a selection panel 48, a pie chart 50, a bar graph 52, and a web page 54. Each of the data representation features in BI dashboard 40 may be associated with a multidimensional data structure, a database, an external web application, or other data source, and provide access to or be populated or defined by a corresponding data source. The data representation features may provide representations or visualizations of data from multidimensional data structures, databases, or other data sources. The data representation features may provide representations or visualizations of data categorized among multiple dimensions such as geographical areas, product categories, sales channels, currencies, and various financial metrics such as unit sales, costs, revenues, profits, and margins, for example.

Various data representation features may be drawn from data sources within an enterprise business intelligence system, and from external data sources that are external to the enterprise business intelligence system. The data representation features may include, for example, representations of BI reports generated with a multidimensional business intelligence data access service, BI reports, web application widgets, web pages, software applications, databases, spreadsheets, news feeds, weather reports, stock market tickers, or tickers for other markets such as indexes, bonds, commodities, mutual funds, exchange traded funds (ETFs), real estate investment trusts (REITs), etc., or any other data source or resource.

As an illustrative example, BI dashboard 40 may be a BI dashboard for sales of sporting goods by an enterprise. In this example, selection panel 48 may include selectable options for viewing various categories of sporting goods, such as golf equipment, hiking equipment, mountaineering equipment, skiing equipment, and running equipment. In this example, BI report 44 may be a report on sales through various order methods from different countries, with column for countries, order methods, unit sales, and revenues; spreadsheet 46 may show revenues per product category per year; pie chart 50 may display proportions of revenue through different product categories in a selected time period; and bar chart 52 may display proportions of revenue through different product categories in different geographical regions. This basic identifying information about BI dashboard 40 may be included in a specification for the dashboard in a BI portal client application that runs on client computing device 16A as in FIG. 2. The dashboard specification in the BI portal client application may also include formatting data such as the position, the width and height, and the color scheme of each of the data representation features 44, 46, 48, 50, 52, and 54. A dashboard specification may for example be implemented in an Extensible Markup Language (XML) document that indicates the layout and state of the dashboard, such as what data representation features are included, where they are and how they're laid out in the dashboard, and what their current state is, but doesn't contain any of the data for the data representation features.

This identifying information and formatting data indicated by the specification for the BI dashboard 40 may be queried by the server-side BI portal application 21 to generate a thumbnail image that is representative of the BI dashboard 40. When a user opens a BI portal 22 on client computing device 16A, the client BI portal application may send a request to the server-side BI portal application 21 for representations of a number of dashboards including BI dashboard 40. In response, the server-side BI portal application 21 may query the specification for the dashboards, identify the data representation features comprised in each of the dashboards, and identify formatting data for the format of the data representation features in each of the dashboards. The server-side BI portal application 21 may then use this information to generate thumbnail images corresponding to each of the dashboards, where each of the thumbnail images includes stock images representative of the corresponding data representation features in the corresponding dashboard, and in a format that represents the format of the corresponding dashboard. The stock images are simple standardized or stylized images that are representational of corresponding data representation features. The stock images may include frames or stock image templates that are sized and colored based on the formatting data specific to each of the data representation features. A BI thumbnail dashboard generated based on the identifying information and formatting data for BI dashboard 40 is depicted in FIG. 4.

Figure 4:
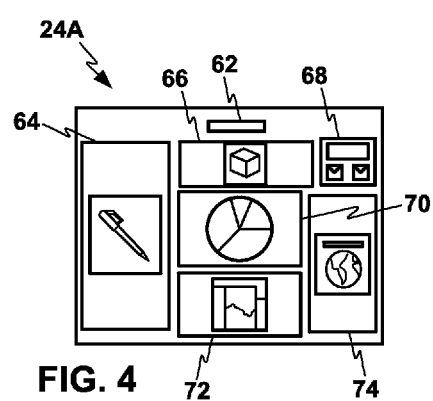
FIG. 4 illustrates an example business intelligence dashboard thumbnail image.

FIG. 4 illustrates an example business intelligence (BI) dashboard thumbnail image 24A based on BI dashboard 40 of FIG. 3. Server-side BI portal application 21 of FIG. 2 may generate BI dashboard thumbnail image 24A and send BI dashboard thumbnail image 24A to client computing device 16A to render on an associated display. BI dashboard thumbnail image 24A includes caption bar icon 62 that represents caption 42, and representative stock images 64, 66, 68, 70, 72, and 74 that represent each of the corresponding data representation features 44, 46, 48, 50, 52, and 54 of dashboard 40. In particular, in this example, stock image 64 is simply a stock image of a pen, which portal application 21 may use to represent a BI report; stock image 66 is a perspective view of a cube, which portal application 21 may use to represent a spreadsheet based on a multidimensional data cube; stock image 68 is a stock image of a set of checkboxes, which portal application 21 may use to represent a selection panel for accepting user selection inputs; stock image 70 is a stock image of a pie chart, which portal application 21 may use to represent a pie chart; stock image 72 is a stock image of a graph, which portal application 21 may use to represent a graph; and stock image 74 is a stock image of the world, which portal application 21 may use to represent a web page.

Server-side BI portal application 21 may include or have access to a library or data store of stock images that it associates with different types of dashboard data representation features, and may draw representative stock images 64, 66, 68, 70, 72, and 74 from this store of stock images. Portal application 21 may apply varying levels of specificity it uses to match stock images to the data representation features of a dashboard, so portal application 21 may select stock images that are very generic or relatively specific to a given data representation feature. Server-side portal application 21 may have varying depths of integration with client-side portal application 22 or may query the dashboard specification from client-side portal application 22 with varying levels of specificity.

Portal application 21 may also frame or modify the stock images in accordance with the formatting data for the specification of the dashboard, as shown in FIG. 4. One or more of the stock images may be not only positioned in the thumbnail in the same relative position as in the dashboard, but also framed with the same aspect ratio, or proportion of height and width, as in the dashboard, as shown in thumbnail 24A of FIG. 4. Portal application 21 may also read the color scheme of each of the data representation features in the dashboard, and apply the same or a similar color scheme to each of the stock images, either by selecting from among stock images stored in a variety of colors, or applying a color code to a stock image template, or modifying the stock images.

By using techniques such as these, portal application 21 generates a thumbnail image that may be specifically and clearly evocative of its corresponding dashboard, so that the thumbnail may rapidly and easily put the user in mind of the corresponding dashboard, even though the thumbnail doesn't use a direct rendering of the dashboard itself or a scaled version of the actual content of the dashboard. Generating a representation based on the dashboard specification instead of actual content may also be useful not only in response time, but also in consistency across browsers and operating systems of the client computing devices. For example, the identifying information and formatting data may be conveyed in JavaScript and be universal to all browsers, whereas reproduction of an image of the dashboard itself may require data from proprietary or non-universal add-ons.

Server-side portal application 21 may generate thumbnail images for each of a number of dashboards in the user's BI portal, simply using dashboard specification data from the client-side BI portal application for each one, and without needing to send requests or otherwise interact with other data sources. The user may have the client-side portal application configured with a set of favorite or home-screen dashboards that the portal renders when the user first opens the portal, in some examples. When the user launches the portal, the client-side portal application 22 may send a request to the server-side portal application 21, which generates the dashboard thumbnails in response.

While in the example of FIG. 4, server-side portal application 21 selects a stock image of a pen to represent a BI report, the portal application may apply more specific or detailed stock images to represent more specific types of reports in other examples. A report may have multiple report parts, and the portal application may identify what report parts a report has, which may include lists, pie charts, bar charts, etc. within a given report. Portal application 21 may then select one or multiple stock images specifically representing the report parts to use to represent an individual BI report in a dashboard, such as stock images of lists, pie charts, bar charts, etc. This may still be based just on identifying information from the dashboard specification available from the client-side portal application itself.

Figure 5:
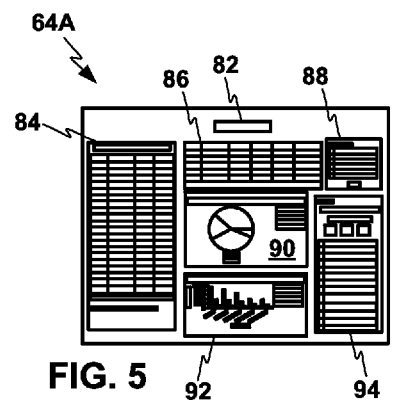
FIG. 5 illustrates another example business intelligence dashboard thumbnail image.

FIG. 5 illustrates another example business intelligence dashboard thumbnail image 64A based on a supplemental technique for rapidly generating a representative thumbnail image of a dashboard in some examples. When the user launches a dashboard, portal application 21 may cache images of the actual dashboard after it is launched. That is, after a user has selected a thumbnail from the portal and run the dashboard itself, portal application 21 may save an image of the full dashboard, with full formatting and population of data from the associated data sources. Portal application 21 may also re-size the dashboard image, such as to a smaller thumbnail-sized image. If portal application 21 later receives a request to generate a thumbnail for a dashboard it has previously cached, portal application 21 may simply use the previously cached image of the executed dashboard for a dashboard thumbnail in the portal. FIG. 5 shows a cached thumbnail image 64A of the executed dashboard 40, simply re-sized and with old data, and as a simple still image. Cached thumbnail image 64A includes caption bar 82 and re-sized copies of data representation features 44, 46, 48, 50, 52, and 54 as icons 84, 86, 88, 90, 92, and 94.

Using cached images of actual dashboards may present an issue with sensitive data that may have been displayed in the dashboard as captured in the cached version. An enterprise may have many users with different levels of authorization or different roles that affect the appropriateness of revealing data from a prior run of a dashboard to other users. One solution to this that portal application 21 may apply is to distort the cached version of the image enough so that it doesn't reveal any of its data to any significant degree. Otherwise, portal application 21 may take into account the user role of the user currently using client-side portal application 22 and either distort or leave unchanged the cached thumbnail based on whether the user is authorized to view the data. While these solutions may be used with server-side caching of the dashboard images, another solution is to cache the dashboard images on the client side so that they are inherently applicable to the same users who had already viewed the original dashboard with its data. The portal application 21 may then query the client-side portal application 22 for whether it has cached dashboard images, as part of the querying of the client side by server-side portal application 21.

Figure 6:
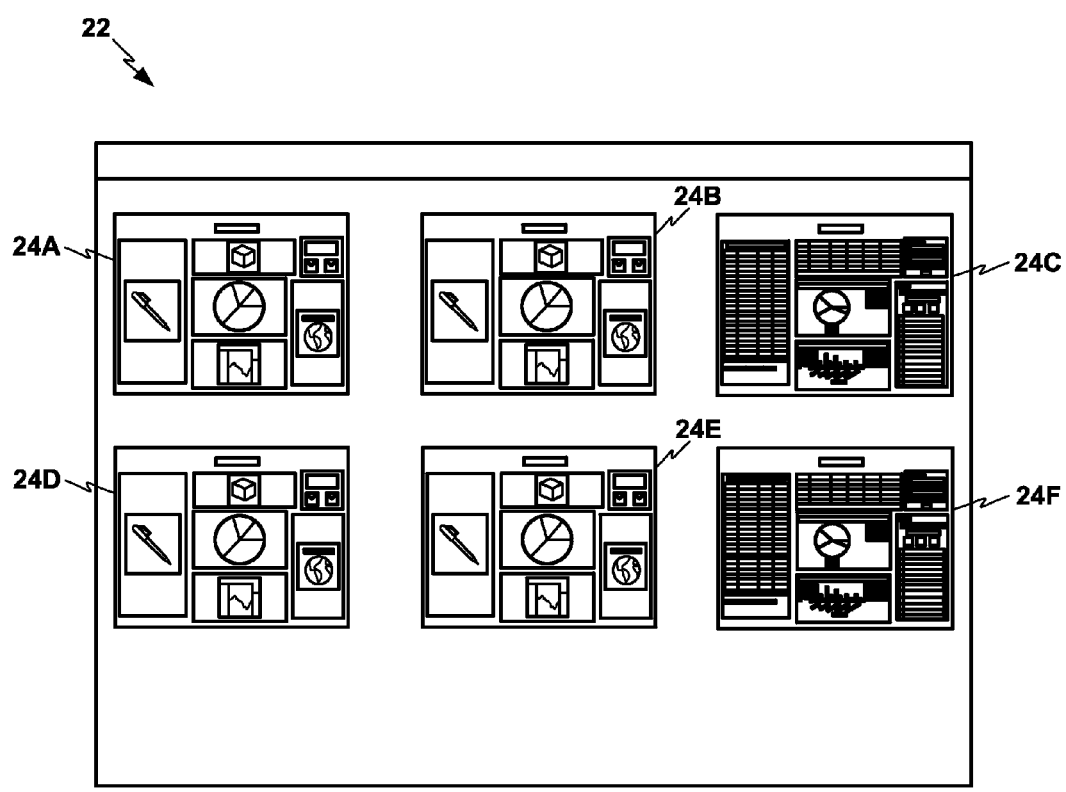
FIG. 6 illustrates an example business intelligence portal that includes a number of business intelligence dashboard thumbnail images.

Portal application 21 may use a combination of thumbnails generated with stock images based on the dashboard specifications as in FIG. 4 and thumbnails based on copies of previously run dashboards as in FIG. 5 in the same portal, as is shown in FIG. 6.

FIG. 6 illustrates an example business intelligence portal 22 that includes a number of business intelligence dashboard thumbnail images 24A, 24B, 24C, 24D, 24E, and 24F. In this example, dashboard thumbnail images 24A, 24B, 24D, and 24E are based on identifying information of the types of data representation features and formatting data, while dashboard thumbnail images 24C and 24F are based on cached reproductions of previous client-side renderings of the corresponding dashboards, both of which may be used in tandem. The portal application may include user options to configure which mode of thumbnail generation to apply to different dashboards according to user preferences.

Figure 7:
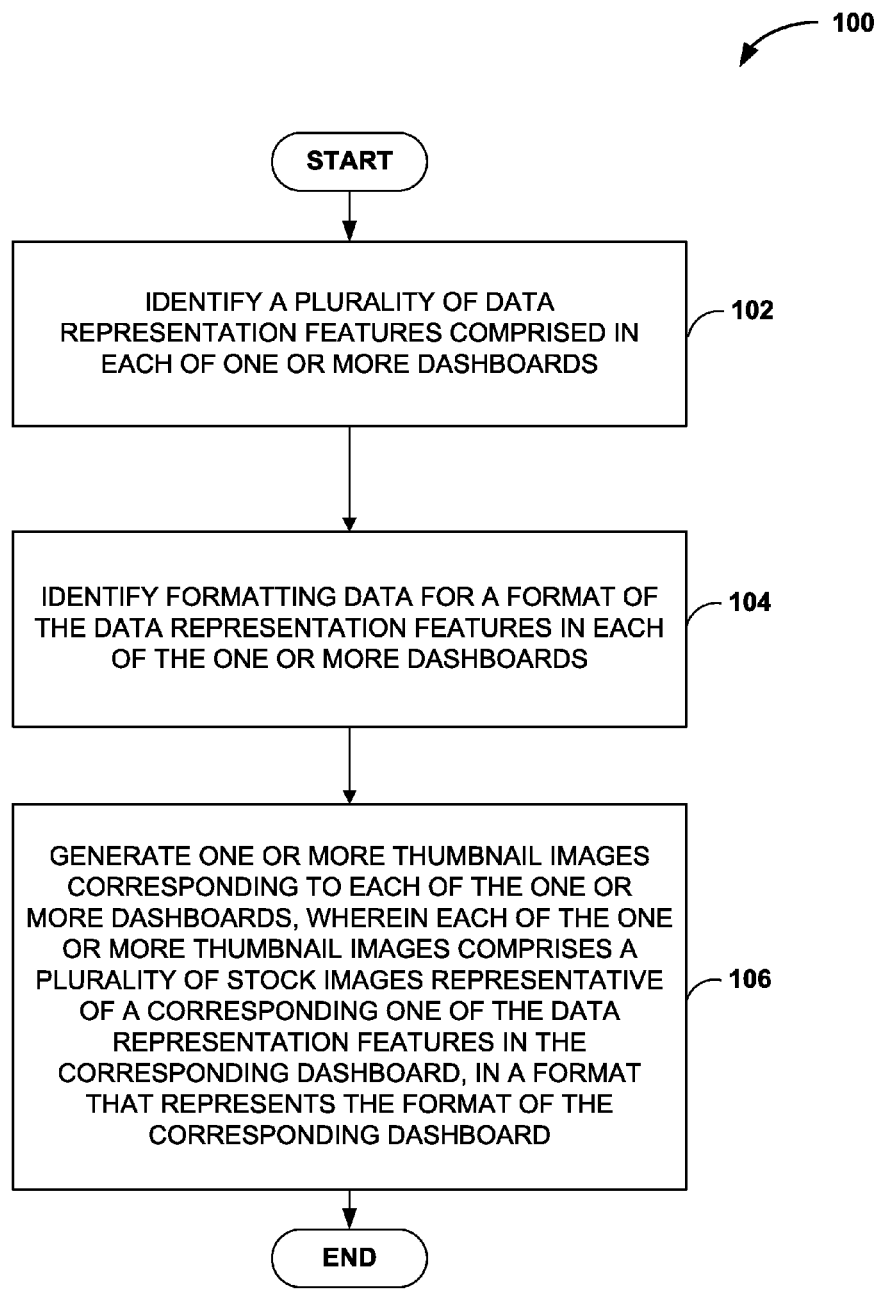
FIG. 7 is a flowchart illustrating example operation of a business intelligence thumbnail generating tool generating a thumbnail image of a business intelligence dashboard.

FIG. 7 is a flowchart for an example process 100 of a business intelligence thumbnail generating tool, such as may be included as part of server-side BI portal application 21, generating a thumbnail image of a business intelligence dashboard. Although described in reference to enterprise business intelligence system 14 of FIGS. 1 and 2 and BI portal application 21 as depicted in FIG. 2 and described in connection with FIGS. 2-6, the principles of process 100 should not be limited to the embodiments described above, and may be applied to any system for a business intelligence portal that is capable of generating BI dashboard thumbnail images. As shown in FIG. 7, portal application 21 identifies a plurality of data representation features comprised in each of one or more dashboards (102). Portal application 21 identifies formatting data for a format of the data representation features in each of the one or more dashboards (104). Portal application 21 then generates one or more thumbnail images, such as BI dashboard thumbnails 24 depicted in FIGS. 2-4, corresponding to each of the one or more dashboards, wherein each of the one or more thumbnail images comprises a plurality of stock images representative of a corresponding one of the data representation features in the corresponding dashboard, in a format that represents the format of the corresponding dashboard (106).

The techniques described herein make reference to business intelligence reports generated with the MDX query language and the SQL query language, as illustrative examples of a multidimensional data query language and a relational database query language, respectively. However, the techniques described herein may be applied to reports generated with any other structured language or tool capable of querying any type of data structures, or with any type of query result set or any other type of data.

Figure 8:
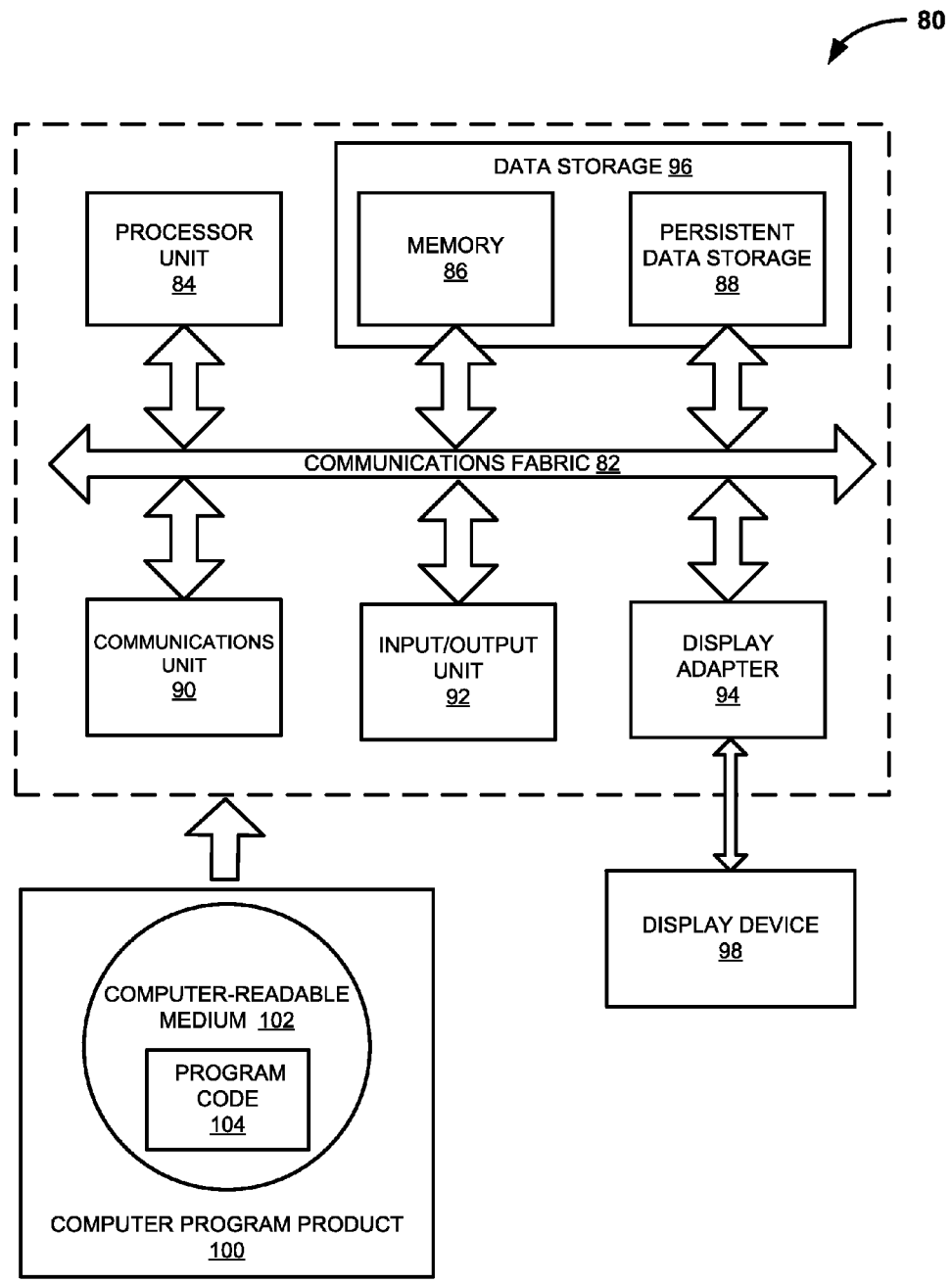
FIG. 8 is a block diagram of a computing device that may run a business intelligence thumbnail generating tool.

FIG. 8 is a block diagram of a computing device 80 that may be used to run a BI dashboard assembly tool, according to an illustrative example. Computing device 80 may be a server such as one of web servers 14A or application servers 14B as depicted in FIG. 2. Computing device 80 may also be any server for providing an enterprise business intelligence application in various examples, including a virtual server that may be run from or incorporate any number of computing devices. A computing device may operate as all or part of a real or virtual server for generating BI thumbnail images, and may be or incorporate a workstation, server, mainframe computer, notebook or laptop computer, desktop computer, tablet, smartphone, feature phone, or other programmable data processing apparatus of any kind. Other implementations of a computing device 80 may include a computer having capabilities or formats other than or beyond those described herein.

In the illustrative example of FIG. 8, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Data storage 96 may include any of various forms of volatile memory that may require being periodically electrically refreshed to maintain data in memory, but those skilled in the art will recognize that this also constitutes an example of a physical, tangible, non-transitory computer-readable data storage device. Executable instructions are stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a BI portal that may search for and render visual representations such as thumbnail images of BI dashboards, to assist a user in viewing and selecting among one or more BI dashboards, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, a mobile device operating system such as iOS® from Apple® Inc., or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

As will be appreciated by one skilled in the art, aspects of the present invention may be embodied as a method, a device, a system, or a computer program product, for example. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable data storage devices or computer-readable data storage components that include computer-readable medium(s) having computer readable program code embodied thereon. For example, a computer-readable data storage device may be embodied as a tangible device that may include a tangible, non-transitory data storage medium, as well as a controller configured for receiving instructions from a resource such as a central processing unit (CPU) to retrieve information stored at one or more particular addresses in the tangible, non-transitory data storage medium, and for retrieving and providing the information stored at those particular one or more addresses in the data storage medium.

The data storage device may store information that encodes both instructions and data, for example, and may retrieve and communicate information encoding instructions and/or data to other resources such as a CPU, for example. The data storage device may take the form of a main memory component such as a hard disc drive or a flash drive in various embodiments, for example. The data storage device may also take the form of another memory component such as a RAM integrated circuit or a buffer or a local cache in any of a variety of forms, in various embodiments. This may include a cache integrated with a controller, a cache integrated with a graphics processing unit (GPU), a cache integrated with a system bus, a cache integrated with a multi-chip die, a cache integrated within a CPU, or the processor registers within a CPU, as various illustrative examples. The data storage apparatus or data storage system may also take a distributed form such as a redundant array of independent discs (RAID) system or a cloud-based data storage service, and still be considered to be a data storage component or data storage system as a part of or a component of an embodiment of a system of the present disclosure, in various embodiments.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, electro-optic, heat-assisted magnetic, or semiconductor system, apparatus, or device, or any suitable combination of the foregoing. A non-exhaustive list of additional specific examples of a computer readable storage medium includes the following: an electrical connection having one or more wires, a portable computer diskette, a hard disc, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device, for example.

Program code embodied on a computer readable medium may be transmitted using any appropriate medium, including but not limited to radio frequency (RF) or other wireless, wire line, optical fiber cable, etc., or any suitable combination of the foregoing. Computer program code for carrying out operations for aspects of the present invention may be written in any combination of one or more programming languages, including an object oriented programming language such as Java, Smalltalk, C++, Objective-C, or the like, or other imperative programming languages such as C, or functional languages such as Common Lisp, Haskell, or Clojure, or multi-paradigm languages such as C#, Python, Ruby, or Scala, among a variety of illustrative examples. One or more sets of applicable program code may execute partly or entirely on the user's desktop or laptop computer, smartphone, tablet, or other computing device; as a stand-alone software package, partly on the user's computing device and partly on a remote computing device; or entirely on one or more remote servers or other computing devices, among various examples. In the latter scenario, the remote computing device may be connected to the user's computing device through any type of network, including a local area network (LAN) or a wide area network (WAN), or the connection may be made to an external computer (for example, through a public network such as the Internet using an Internet Service Provider), and for which a virtual private network (VPN) may also optionally be used.

In various illustrative embodiments, various computer programs, software applications, modules, or other software elements may be executed in connection with one or more user interfaces being executed on a client computing device, that may also interact with one or more web server applications that may be running on one or more servers or other separate computing devices and may be executing or accessing other computer programs, software applications, modules, databases, data stores, or other software elements or data structures. A graphical user interface may be executed on a client computing device and may access applications from the one or more web server applications, for example. Various content within a browser or dedicated application graphical user interface may be rendered or executed in or in association with the web browser using any combination of any release version of HTML, CSS, JavaScript, XML, AJAX, JSON, and various other languages or technologies. Other content may be provided by computer programs, software applications, modules, or other elements executed on the one or more web servers and written in any programming language and/or using or accessing any computer programs, software elements, data structures, or technologies, in various illustrative embodiments.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, may create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices, to produce a computer implemented process such that the instructions which execute on the computer or other programmable apparatus provide or embody processes for implementing the functions or acts specified in the flowchart and/or block diagram block or blocks.

The flowchart and block diagrams in the figures illustrate the architecture, functionality, and operation of possible implementations of devices, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may be executed in a different order, or the functions in different blocks may be processed in different but parallel threads, depending upon the functionality involved. Each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The description of the present disclosure has been presented for purposes of illustration and description, and is not intended to be exhaustive or limited to the disclosure in the form disclosed. Many modifications and variations will be understood by those of ordinary skill in the art based on the concepts disclosed herein. The particular examples described were chosen and disclosed in order to explain the principles of the disclosure and example practical applications, and to enable others of ordinary skill in the art to understand the disclosure for various embodiments with various modifications as are suited to the particular use contemplated. The various examples described herein and other embodiments are within the scope of the following claims.

What is claimed is:

1. A method comprising:
identifying a plurality of data representation features comprised in each of one or more business intelligence dashboards;
identifying formatting data for a format of the data representation features in each of the one or more business intelligence dashboards; and
generating, by one or more processors of a computing device, one or more thumbnail images corresponding to each of the one or more corresponding business intelligence dashboards, wherein each of the one or more thumbnail images is generated to comprise a set of template images arranged in a format representative of the format of the data representation features in the corresponding business intelligence dashboard, wherein each of the template images in the set is selected from a plurality of stock template images and represents a corresponding data representation feature in the corresponding business intelligence dashboard, and wherein the plurality of stock template images includes one or more of:
a template image representing a stock business intelligence report,
a template image representing a stock spreadsheet,
a template image representing a stock selection panel,
a template image representing a stock chart,
a template image representing a stock graph, and
a template image representing a stock web application widget.

2. The method of claim 1, wherein each of the data representation features in the corresponding business intelligence dashboards are configured to access and represent data from a respective data source, and wherein the template images are independent of the respective data sources.

3. The method of claim 2, wherein generating the one or more thumbnail images is performed without querying the respective data sources that the data representation features in the corresponding business intelligence dashboards are configured to access.

4. The method of claim 1, further comprising receiving a request to generate a portal to the one or more business intelligence dashboards from a client device, and generating the one or more thumbnail images in response to receiving the request from the client device.

5. The method of claim 4, further comprising outputting the one or more thumbnail images to the client device.

6. The method of claim 1, further comprising providing a link from each of the one or more thumbnail images to the corresponding business intelligence dashboards.

7. The method of claim 6, further comprising receiving an input indicating a selected thumbnail image, and generating the business intelligence dashboard corresponding to the selected thumbnail image.

8. The method of claim 1, further comprising rendering each of the template images with an aspect ratio that matches an aspect ratio of the corresponding data representation features in the corresponding business intelligence dashboard.

9. The method of claim 1, further comprising rendering each of the template images with a color scheme that matches a color scheme of the corresponding data representation features in the corresponding business intelligence dashboard.

10. The method of claim 1, wherein one of the data representation features comprises a chart, and the corresponding thumbnail image comprises the template image of the stock chart in a position corresponding to a position of the chart in the corresponding dashboard.

11. The method of claim 1, wherein one of the data representation features comprises a graph, and the corresponding thumbnail image comprises the template image of the stock graph in a position corresponding to a position of the graph in the dashboard.

12. The method of claim 1, wherein one of the data representation features comprises a business intelligence report, and the corresponding thumbnail image comprises the template image representing the stock business intelligence report in a position corresponding to a position of the business intelligence report in the dashboard.

13. The method of claim 1, wherein one of the data representation features comprises a web application widget, and the corresponding thumbnail image comprises the template image representing the stock web application widget in a position corresponding to a position of the web application widget in the dashboard.

14. The method of claim 1, further comprising providing a re-sized cached image of a previous client-side rendering of a business intelligence dashboard as the corresponding thumbnail image for one or more of the business intelligence dashboards.

15. A computing system comprising:
one or more processors;
one or more computer-readable data storage devices; and
a software application, stored on the one or more computer-readable data storage devices for execution by the one or more processors, and configured for generating one or more business intelligence thumbnail images for a business intelligence portal, wherein the software application comprises:
program instructions for identifying a plurality of data representation features comprised in each of one or more business intelligence dashboards;
program instructions for identifying formatting data for a format of the data representation features in each of the one or more business intelligence dashboards; and
program instructions for generating one or more thumbnail images corresponding to each of the one or more business intelligence dashboards, wherein each of the one or more thumbnail images is generated to comprise a set of template images arranged in a format representative of the format of the data representation features in the corresponding business intelligence dashboard, wherein each of the template images in the set is selected from a plurality of stock template images and represents a corresponding one of the data representation features in the corresponding business intelligence dashboard, and wherein the plurality of stock template images includes one or more of:
a template image representing a stock business intelligence report,
a template image representing a stock spreadsheet,
a template image representing a stock selection panel,
a template image representing a stock chart,
a template image representing a stock graph, and
a template image representing a stock web application widget.

16. The computing system of claim 15, wherein the software application further comprises:

program instructions for receiving a request to generate a portal to the one or more dashboards from a client device;

program instructions for generating the one or more thumbnail images in response to receiving the request from the client device; and program instructions for outputting the one or more thumbnail images to the client device.

17. The computing system of claim 15, wherein the software application further comprises:

program instructions for rendering each of the template images with an aspect ratio that matches an aspect ratio of the corresponding data representation features in the corresponding business intelligence dashboard; and program instructions for rendering each of the template images with a color scheme that matches a color scheme of the corresponding data representation features in the corresponding business intelligence dashboard.

18. A computer program product comprising executable instructions stored on a non-transitory computer-readable storage medium, configured for causing one or more programmable processors to:

identify a plurality of data representation features comprised in each of one or more business intelligence dashboards;

identify formatting data for a format of the data representation features in each of the one or more business intelligence dashboards; and generate one or more thumbnail images corresponding to each of the one or more business intelligence dashboards, wherein each of the one or more thumbnail images is generated to comprise a set of template images arranged in a format representative of the format of the data representation features in the corresponding business intelligence dashboard, wherein each of the template images in the set is selected from a plurality of stock template images and represents a corresponding one of the data representation features in the corresponding business intelligence dashboard, and wherein the plurality of stock template images includes one or more of:

a template image representing a stock business intelligence report, a template image representing a stock spreadsheet, a template image representing a stock selection panel, a template image representing a stock chart, a template image representing a stock graph, and a template image representing a stock web application widget.

19. The computer program product of claim 18, further comprising:

program instructions for receiving a request to generate a portal to the one or more dashboards from a client device;

program instructions for generating the one or more thumbnail images in response to receiving the request from the client device; and program instructions for outputting the one or more thumbnail images to the client device.

20. The computer program product of claim 18, further comprising:

program instructions for rendering each of the template images with an aspect ratio that matches an aspect ratio of the corresponding data representation features in the corresponding business intelligence dashboard; and program instructions for rendering each of the template images with a color scheme that matches a color scheme of the corresponding data representation features in the corresponding business intelligence dashboard.

21. The method of claim 1, wherein the plurality of stock template images are standardized or stylized template images representative of a plurality of data representation features.

* * * * *